(12) United States Patent
Takura et al.

(10) Patent No.: US 11,622,036 B2
(45) Date of Patent: Apr. 4, 2023

(54) TERMINAL CASE, GRIPPING DEVICE, AND INFORMATION PROCESSING DEVICE

(71) Applicant: Sony Group Corporation, Tokyo (JP)

(72) Inventors: Kento Takura, Tokyo (JP); Yoshihiro Takagi, Tokyo (JP); Koichi Obana, Tokyo (JP)

(73) Assignee: SONY GROUP CORPORATION, Tokyo (JP)

(*) Notice: Subject to any disclaimer, the term of this patent is extended or adjusted under 35 U.S.C. 154(b) by 29 days.

(21) Appl. No.: 17/283,256

(22) PCT Filed: Oct. 31, 2018

(86) PCT No.: PCT/JP2018/040576
§ 371 (c)(1),
(2) Date: Apr. 7, 2021

(87) PCT Pub. No.: WO2020/090050
PCT Pub. Date: May 7, 2020

(65) Prior Publication Data
US 2021/0344786 A1    Nov. 4, 2021

(51) Int. Cl.
| | |
|---|---|
| *H04B 1/38* | (2015.01) |
| *H04M 1/21* | (2006.01) |
| *A63F 13/92* | (2014.01) |
| *A63F 13/98* | (2014.01) |

(Continued)

(52) U.S. Cl.
CPC ............... *H04M 1/21* (2013.01); *A63F 13/92* (2014.09); *A63F 13/98* (2014.09); *H04M 1/0274* (2013.01); *H04M 1/11* (2013.01); *A63F 2300/204* (2013.01)

(58) Field of Classification Search
CPC ........ H04M 1/21; H04M 1/0274; H04M 1/11; H04M 1/185; A63F 13/92; A63F 13/98
See application file for complete search history.

(56) References Cited

U.S. PATENT DOCUMENTS

| | | | |
|---|---|---|---|
| 7,733,637 B1 * | 6/2010 | Lam ..................... | G06F 3/0202 |
| | | | 361/679.08 |
| 9,539,507 B2 * | 1/2017 | Schoenith ............... | A63F 13/24 |
| 10,039,976 B2 * | 8/2018 | Kim ........................ | G06F 3/016 |

(Continued)

FOREIGN PATENT DOCUMENTS

| | | |
|---|---|---|
| CN | 207612322 U | 7/2018 |
| EP | 3703350 A1 | 9/2020 |

(Continued)

OTHER PUBLICATIONS

International Search Report and Written Opinion dated Jan. 15, 2019, received for PCT Application PCT/JP2018/040576, Filed on Oct. 31, 2018, 10 pages including English Translation.

*Primary Examiner* — Tuan Pham
(74) *Attorney, Agent, or Firm* — Xsensus LLP

(57) ABSTRACT

The present technique provides a terminal case capable of mounting an external device thereon without detaching a case. A terminal case according to the present technique includes: a housing portion for housing a terminal in a state in which a display included in the terminal can be exposed; a mounted portion to which a gripping device including a gripping portion to be gripped by a user is mounted; and a communication portion for communicating between the terminal and the gripping device.

17 Claims, 9 Drawing Sheets

(51) Int. Cl.
    *H04M 1/02*     (2006.01)
    *H04M 1/11*     (2006.01)

(56)          References Cited

U.S. PATENT DOCUMENTS

| | | |
|---|---|---|
| 2013/0106687 A1 | 5/2013 | Baum et al. |
| 2013/0120258 A1 | 5/2013 | Maus |
| 2014/0179372 A1 | 6/2014 | Zajeski |
| 2014/0247246 A1* | 9/2014 | Maus .................... G06F 3/0393 |
| | | 345/174 |
| 2015/0303968 A1 | 10/2015 | Sweet, III et al. |
| 2018/0117460 A1* | 5/2018 | Townley ............... G06F 13/102 |

FOREIGN PATENT DOCUMENTS

| | | |
|---|---|---|
| JP | S6030209 U | 3/1985 |
| JP | 2007-151014 A | 6/2007 |
| JP | 2010-539813 A | 12/2010 |

* cited by examiner

TERMINAL CASE, GRIPPING DEVICE, AND INFORMATION PROCESSING DEVICE

CROSS-REFERENCE TO RELATED APPLICATION

The present application is based on PCT filing PCT/JP2018/040576, filed Oct. 31, 2018, the entire contents of which are incorporated herein by reference.

FIELD

The present disclosure relates to a terminal case, a gripping device, and an information processing device.

BACKGROUND

Terminals such as smartphones and tablet terminals are widely used for applications such as communication, video viewing, and games. A user of a terminal uses the terminal for the above-mentioned application on the move or outside. Thus, various developments have been made on terminals so that users can use the terminals comfortably.

For example, Patent Literature 1 below discloses a portable information device terminal capable of improving key operability, in particular, key operation for executing entertainment functions represented by game functions, to improve usability.

CITATION LIST

Patent Literature

Patent Literature 1: JP 2007-151014 A

SUMMARY

Technical Problem

The portable information device terminal disclosed in Patent Literature 1 rotates a display part casing thereof horizontally with respect to a body part casing thereof, and changes the form of the portable information device terminal depending on the usage.

Users of terminals such as smartphones and tablet terminals may use a terminal having a case mounted thereto. In the case of mounting another device to the terminal, the case mounted to the terminal needs to be detached. Thus, it is required to provide a terminal case capable of mounting an external device thereon without detaching a case.

Solution to Problem

According to the present disclosure, a terminal case is provided that includes: a housing portion having an opening in at least one surface of the housing portion, for housing a terminal; a mounting portion to which a gripping device including a gripping portion to be gripped by a user is mounted; and a communication portion for communicating between the terminal and the gripping device.

Moreover, according to the present disclosure, a gripping device is provided that includes: a first gripping portion to be gripped by a user; and a second gripping portion to be gripped by the user, the second gripping portion being different from the first gripping portion, wherein the first gripping portion and the second gripping portion each include a mounted portion to which a terminal case for housing a terminal is mounted, and a communication portion for communicating with the terminal through the terminal case.

Moreover, according to the present disclosure, an information processing device is provided that includes: a terminal case for housing a terminal; and a gripping device to be gripped by a user, wherein the terminal case includes a housing portion having an opening in at least one surface of the housing portion, for housing the terminal, a mounting portion to which a gripping device including a gripping portion to be gripped by the user is mounted, and a communication portion for communicating between the terminal and the gripping device, the gripping device includes a first gripping portion to be gripped by the user, and a second gripping portion to be gripped by the user, the second gripping portion being different from the first gripping portion, and the first gripping portion and the second gripping portion each include a mounted portion to which the terminal case housing the terminal is mounted, and a communication portion for communicating with the terminal through the terminal case.

DESCRIPTION OF EMBODIMENTS

Referring to the accompanying drawings, preferred embodiments of the present disclosure are described in detail below. Note that, in the specification and the drawings, components having substantially the same functional configurations are denoted by the same reference symbols, and overlapping descriptions are omitted. The ratios and dimensions of the components in the figures do not indicate the actual ratios and dimensions of the components.

Descriptions are made in the following order:
<1. Appearance Configuration Example of Information Processing Device 1>
<2. Mounting Example of Information Processing Device 1>
<3. Functional Configuration Example of Information Processing Device 1>

<4. Operation Example of Information Processing Device 1>
<5. Hardware Configuration Example>
<6. Conclusion>

1. Appearance Configuration Example of Information Processing Device 1

Figure 1:
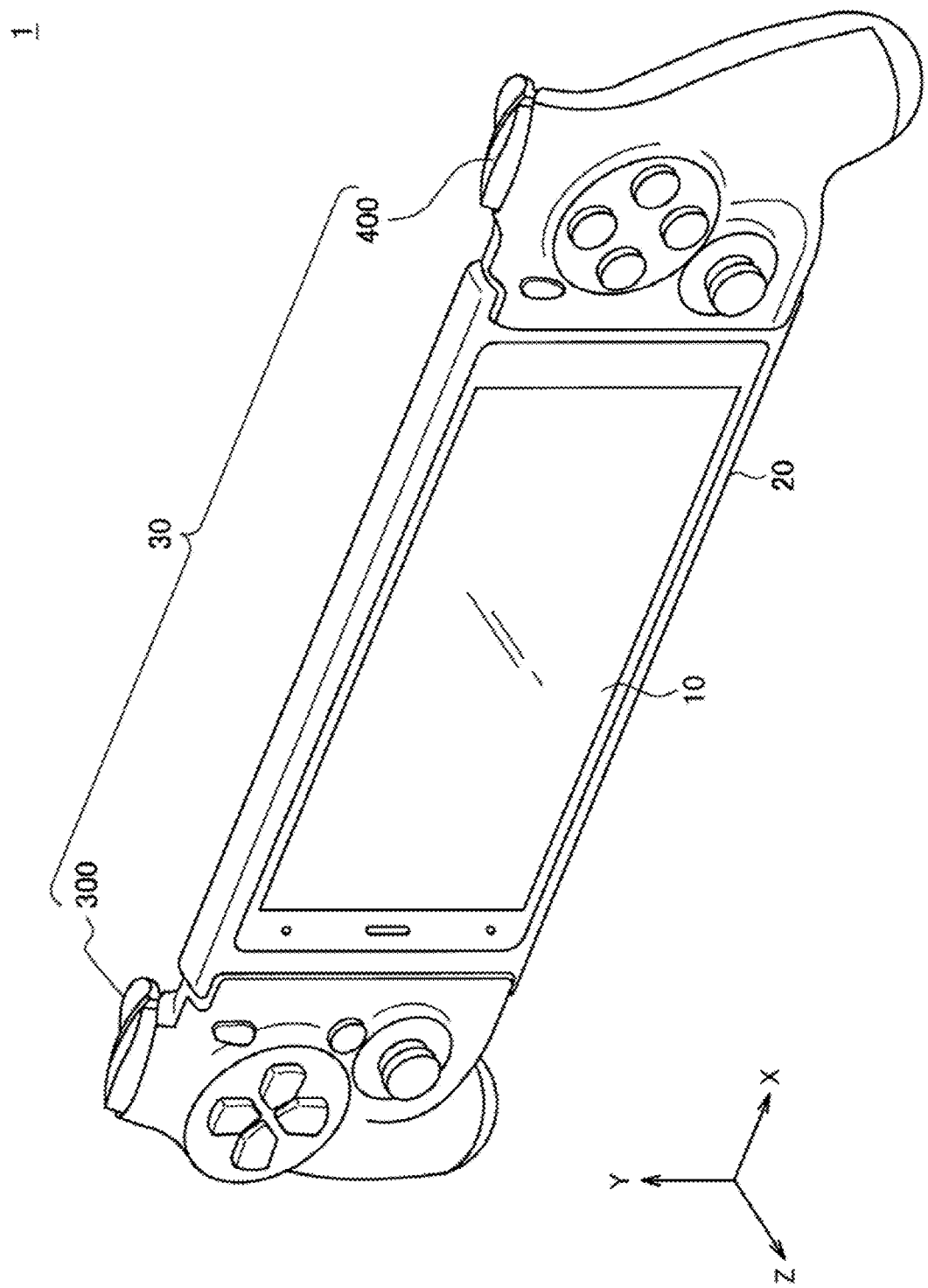
FIG. 1 is a perspective view illustrating an example of an information processing device according to an embodiment.
Figure 2:
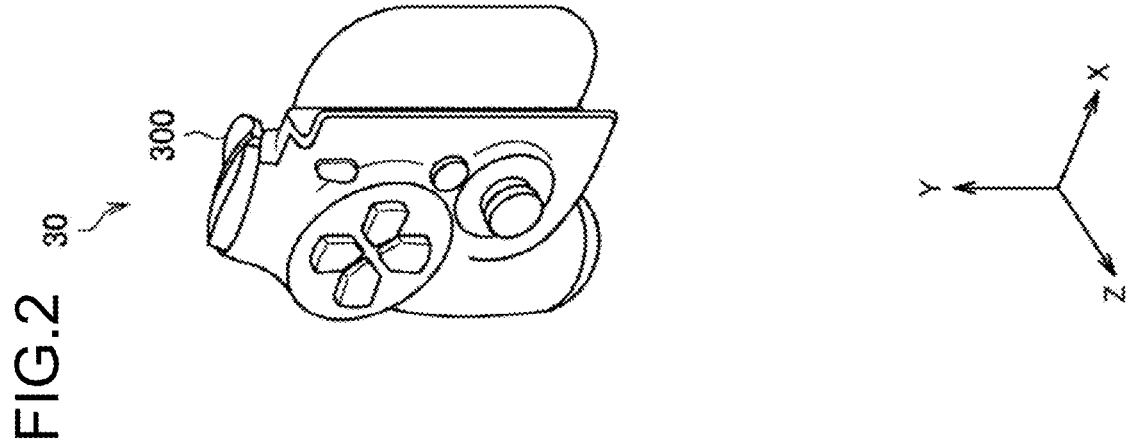
FIG. 2 is an exploded perspective view of the information processing device illustrated in FIG. 1.
Figure 3:
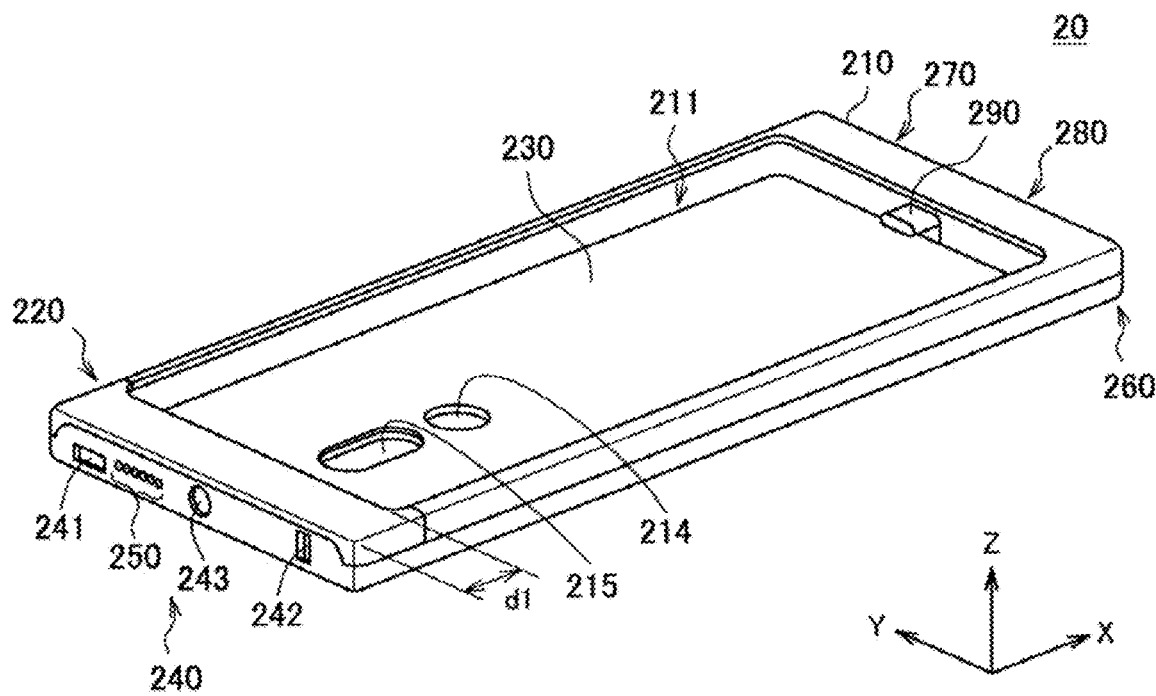
FIG. 3 is a perspective view illustrating an example of a terminal case according to one embodiment of the present disclosure.
Figure 4:
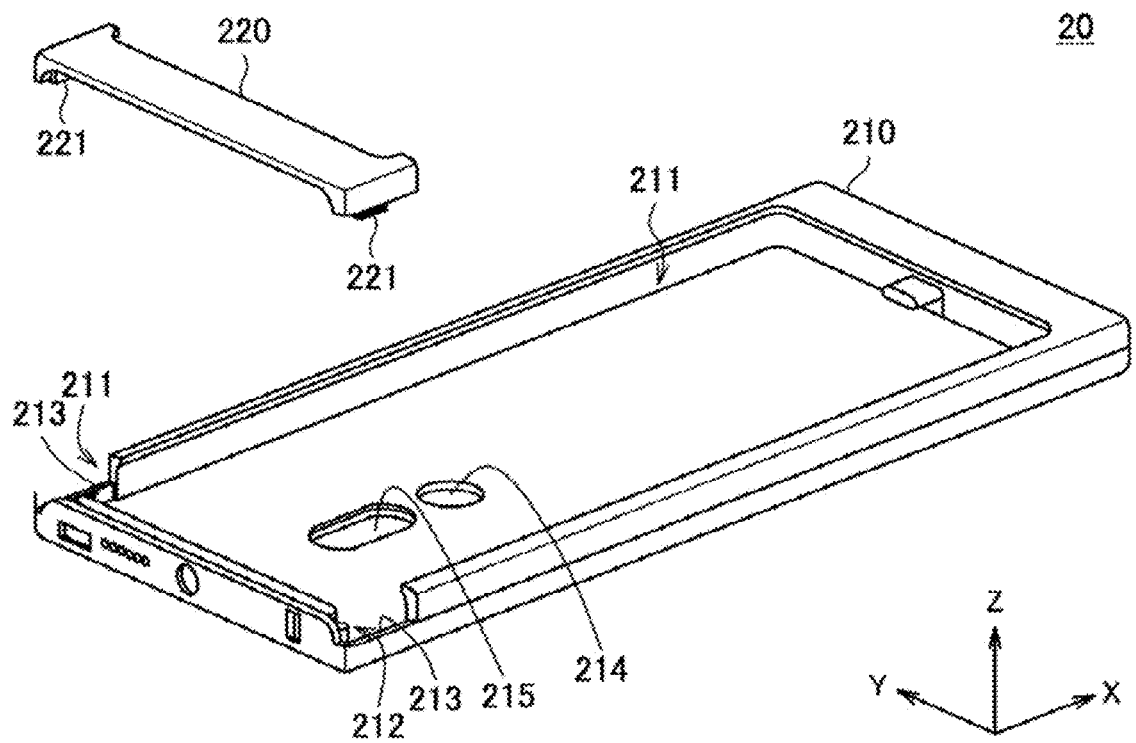
FIG. 4 is an exploded perspective view illustrating an example of the terminal case according to the embodiment.
Figure 5:
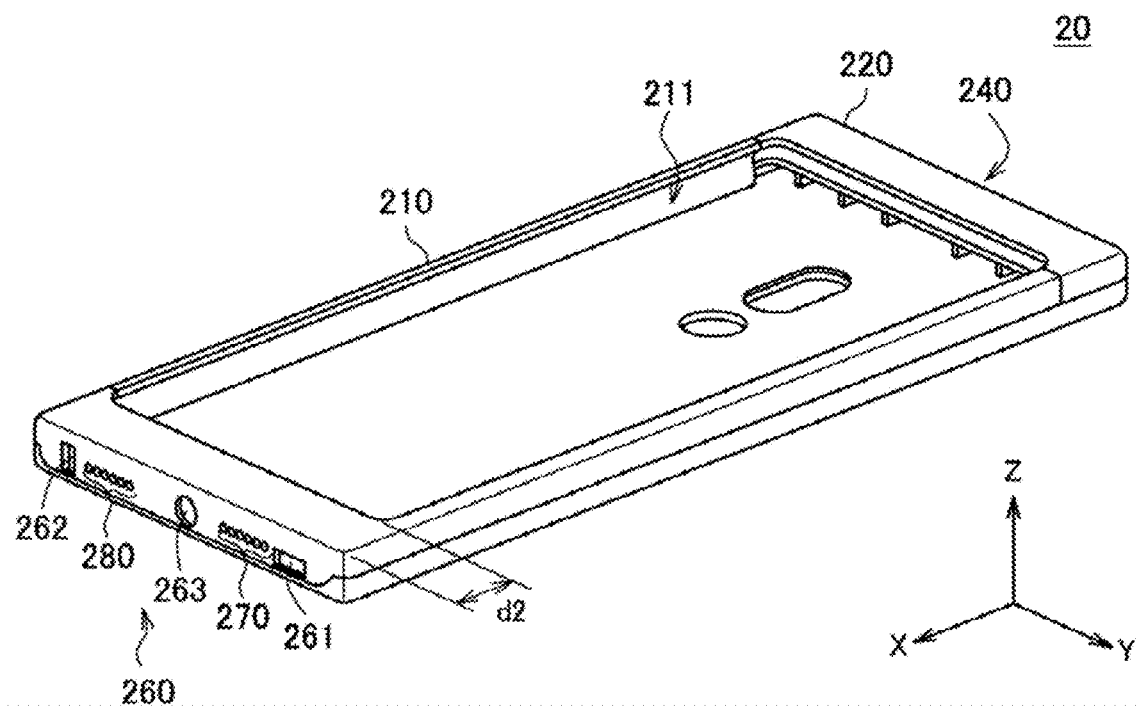
FIG. 5 is a perspective view illustrating an example of the terminal case according to the embodiment.
Figure 6:
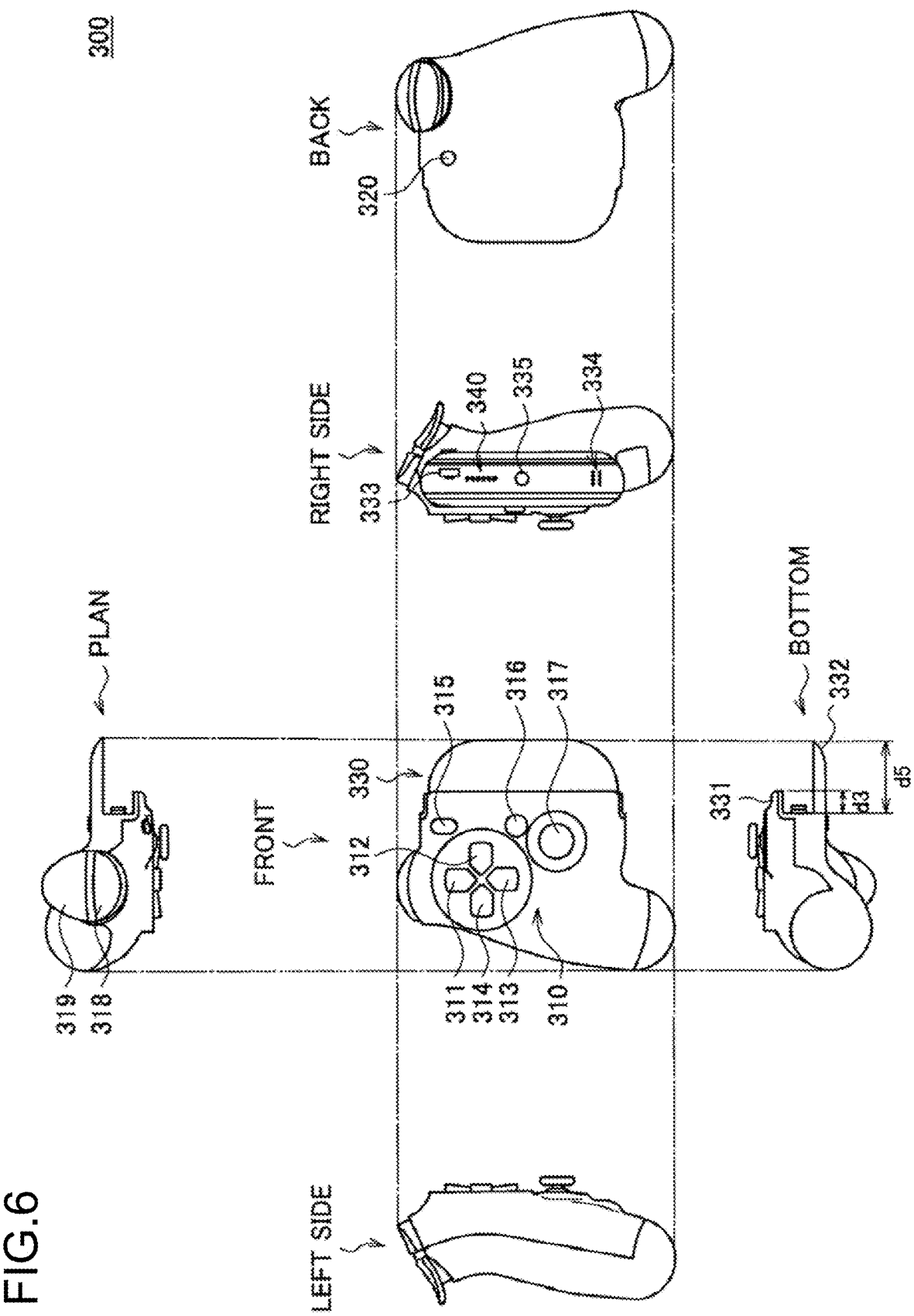
FIG. 6 is a six-perspective view of a left controller as an example of a gripping device according to one embodiment of the present disclosure.
Figure 7:
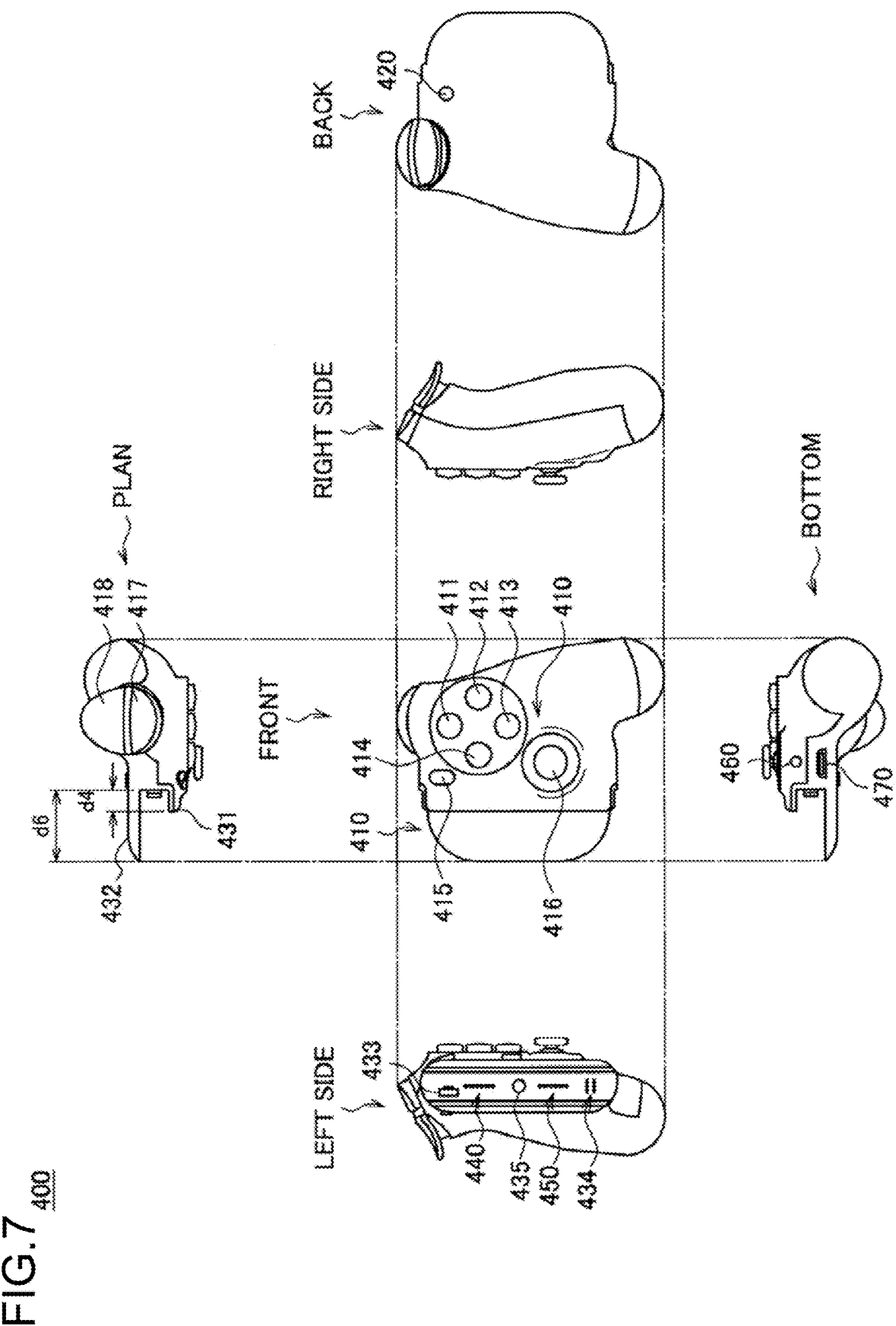
FIG. 7 is a six-perspective view of a right controller as an example of the gripping device according to the embodiment.

First, an appearance configuration example of an information processing device 1 according to the present embodiment is described with reference to FIG. 1 to FIG. 9. FIG. 1 is a perspective view illustrating an example of the information processing device according to one embodiment of the present disclosure. FIG. 2 is an exploded perspective view of the information processing device illustrated in FIG. 1. FIG. 3 is a perspective view illustrating an example of a terminal case according to the present embodiment. FIG. 4 is an exploded perspective view illustrating an example of the terminal case according to the present embodiment. FIG. 5 is a perspective view illustrating an example of the terminal case according to the present embodiment. FIG. 6 is a six-perspective view of a left controller as an example of a gripping device according to one embodiment of the present disclosure. FIG. 7 is a six-perspective view of a right controller according to an example of a gripping device according to the present embodiment.

The information processing device 1 includes a terminal case 20 having a terminal 10 housed therein, and a controller 30. As illustrated in FIG. 1, the information processing device 1 has a structure in which a left controller 300 and a right controller 400 constituting the controller 30 are mounted on both sides of the terminal case 20. As illustrated in FIG. 2, the controller 30 has a structure in which the left controller 300 and the right controller 400 are separated from each other. Note that the controller 30 is an example of a gripping device in the present disclosure, the left controller 300 is an example of a first gripping portion in the present disclosure, and the right controller 400 is an example of a second gripping portion in the present disclosure.

<1.1. Appearance Configuration Example of Terminal 10>

The terminal 10 to which an information processing device 1 is applied is a substantially plate-shaped terminal having a display. The terminal 10 is provided with a terminal connectable to an external device. The terminal 10 is, for example, a touch device, and specifically, a tablet terminal or a smartphone is applicable. The terminal 10 executes various kinds of computer programs, and displays images based on the computer programs on the display. The terminal 10 may be provided with a camera, and may be provided with a lens for taking images with the camera in the terminal 10 or an illumination.

<1.2. Appearance Configuration Example of Terminal Case 20>

As illustrated in FIG. 3, the terminal case 20 is formed by a housing member 210 and a lid member 220, and has an opening 230 in one surface of the terminal case 20. The opening 230 is formed by the housing member 210 and the lid member 220. The terminal case 20 includes a first mounting portion 240 and a terminal 250 on the left side (X-axis negative direction side) and a second mounting portion 260, a terminal 270, and a terminal 280 on the right side (X-axis positive direction side). The terminal case 20 further includes a coupling portion 290 so as to protrude from the inner surface of the second mounting portion 260 to a housing space 211. The first mounting portion 240 and the second mounting portion 260 are an example of a mounting portion according to the present disclosure.

In the present embodiment, the terminal case 20 has a substantially rectangular parallelepiped shape. In the present embodiment, a surface of the terminal case 20 that has the opening 230 is referred to as "front surface", and a surface on the opposite side of the front surface is referred to as "back surface". In the present embodiment, the longitudinal direction of the front surface of the terminal case 20 (X-axis direction illustrated in FIG. 3) is referred to as "left-right direction", a direction perpendicular to the longitudinal direction of the front surface of the terminal case 20 (Y-axis direction illustrated in FIG. 3) is referred to as "up-down direction", and a direction perpendicular to the front surface (Z-axis direction illustrated in FIG. 3) is referred to as "height direction". The positive direction of the X axis is referred to as "right direction", the negative direction of the X axis is referred to as "left direction, the positive direction of the Y axis is referred to as "up direction", the negative direction of the Y axis is referred to as "down direction", the positive direction of the Z axis is referred to as "front direction", and the negative direction of the Z axis is referred to as "back direction".

The housing member 210 has a rectangular parallelepiped shape, and has the housing space 211 having a shape corresponding to the shape of the terminal 10. As illustrated in FIG. 4, the housing member 210 has cutouts 212 at an upper part and a lower part in a left region. The housing space 211 is an example of a housing portion according to the present disclosure. The area of a surface of the housing space 211 perpendicular to the height direction is smaller than the area of the opening 230. The terminal 10 is inserted to the housing space 211 from the side having the cutouts 212. The housing member 210 includes locking reception portions 213, a lens hole 214, an illumination hole 215, and wiring (not shown).

The locking reception portions 213 are provided in the inner surface of the housing member 210 at lower parts of the cutouts 212. When locking portions 221 provided to the lid member 220 are locked to the locking reception portions 213, the housing member 210 and the lid member 220 are fixed together, and the cutouts 212 are closed by the lid member 220.

The lens hole 214 is provided at a position corresponding to a position on the terminal 10 at which a lens is provide, and is, for example, provided in the back surface of the housing member 210. A user can take a photograph with a camera provided to the terminal 10 through the lens hole 214. Note that the lens hole 214 may be provided at a position other than the illustrated position, and the lens hole 214 is not necessarily required to be provided to the housing member 210 when the terminal 10 does not have a lens.

The illumination hole 215 is provided at a position corresponding to a position on the terminal 10 at which illumination is provided, and is, for example, provided on the back side of the housing member 210. A user can take a photograph while illuminating a photographing target by the illumination provided to the terminal 10 through the illumination hole 215. Note that the illumination hole 215 may be provided at a position other than the illustrated position, and the illumination hole 215 is not necessarily required to be provided to the housing member 210 when the terminal 10 does not have illumination.

The wiring is disposed inside the housing member 210, and electrically connects the terminal 250 and the terminal 270 together. The wiring is not particularly limited as long as the terminal 250 and the terminal 270 can be electrically connected. For example, a flexible flat cable is used for the wiring.

Note that the housing member in the present embodiment is not limited to the illustrated form, and, for example, the outer shape may be various shapes such as a polygonal column, a column, and a sphere.

As illustrated in FIG. 3, the lid member 220 is disposed in a left region of the front surface of the terminal case 20. The lid member 220 constitutes a part of the first mounting portion 240 described later. The lid member 220 has a shape corresponding to the shape of the second mounting portion 260 described later. As illustrated in FIG. 4, the lid member 220 has the locking portions 221 to be locked to the locking reception portions 213.

The locking portions 221 are provided so as to protrude in the up-down direction at both end portions of the lid member 220 in the longitudinal direction (up-down direction). When the locking portions 221 are locked to the locking reception portions 213, the cutouts 212 are closed by the lid member 220. Then, the housing member 210 and the lid member 220 are fixed together.

As described above, the opening 230 is formed in one surface of the terminal case 20. The area of the opening 230 is smaller than the area of a surface of the terminal 10 that has a display. In this manner, the terminal 10 is prevented from being detached from the terminal case 20 through the opening 230.

The first mounting portion 240 corresponds to a part of the terminal case 20 on the left side of the housing space 211. The left controller 300 is mounted to the first mounting portion 240. The first mounting portion 240 has a locking reception portion 241, a locking reception portion 242, and a positioning portion 243.

A length d1 of the first mounting portion 240 in the left-right direction illustrated in FIG. 3 is equal to or larger than a length d3 of a first extending portion 331 of the left controller 300 in the left-right direction illustrated in FIG. 6. The length d1 of the first mounting portion 240 in the left-right direction is equal to or larger than the length d3 of the first extending portion 331 in the left-right direction, and hence the first extending portion 331 is prevented from hindering the displaying on the display of the terminal 10.

The locking reception portion 241 is provided at an upper part of the left side surface of the first mounting portion 240. A movable claw portion 333 provided to a mounted portion 330 of the left controller 300 illustrated in FIG. 6 is locked to the locking reception portion 241. The locking reception portion 241 is not particularly limited as long as the locking reception portion 241 has a shape that can lock the movable claw portion 333.

The locking reception portion 242 is provided at a lower part of the left side surface of the first mounting portion 240. A claw portion 334 provided to the mounted portion 330 in the left controller 300 illustrated in FIG. 6 is locked to the locking reception portion 242. The locking reception portion 242 is not particularly limited as long as the locking reception portion 242 has a shape that can lock the claw portion 334.

The positioning portion 243 is provided at a center part of the left side surface of the first mounting portion 240. The positioning portion 243 is fitted to a positioning portion 335 of the left controller 300 illustrated in FIG. 6. In this manner, the positions of the terminal case 20 and the left controller 300 are determined. The shape of the positioning portion 243 corresponds to the shape of the positioning portion 335 such that the positioning portion 243 and the positioning portion 335 are fitted together. For example, in FIG. 3, the positioning portion 243 is a circular recess.

As illustrated in FIG. 5, the second mounting portion 260 corresponds to a part of the terminal case 20 on the right side (X-axis positive direction side) of the housing space 211. The right controller 400 is mounted to the second mounting portion 260. As illustrated in FIG. 5, the second mounting portion 260 has a locking reception portion 261, a locking reception portion 262, and a positioning portion 263.

A length d2 of the second mounting portion 260 in the left-right direction may be equal to or larger than a length d4 of a third extending portion 431 of the right controller 400 in the left-right direction illustrated in FIG. 7. The length d2 of the second mounting portion 260 in the left-right direction is equal to or larger than the length d4 of the third extending portion 431 in the left-right direction, and hence the third extending portion 431 is prevented from hindering the displaying on the display of the terminal 10.

The locking reception portion 261 is provided at an upper part of the right side surface of the second mounting portion 260. A movable claw portion 433 provided to a mounted portion 430 of the right controller 400 illustrated in FIG. 7 is locked to the locking reception portion 261. The locking reception portion 261 may have a shape corresponding to the shape of the movable claw portion 433.

The locking reception portion 262 is provided at a lower part of the right side surface of the second mounting portion 260. A claw portion 434 provided to the mounted portion 430 in the right controller 400 illustrated in FIG. 7 is locked to the locking reception portion 262. The locking reception portion 262 may have a shape corresponding to the shape of the claw portion 434.

The positioning portion 263 is provided at a center part of the right side surface of the second mounting portion 260. The positioning portion 263 is fitted to a positioning portion 435 of the right controller 400 illustrated in FIG. 7. In this manner, the positions of the terminal case 20 and the right controller 400 are determined. The shape of the positioning portion 263 corresponds to the shape of the positioning portion 435 such that the positioning portion 263 and the positioning portion 435 are fitted together. For example, the positioning portion 263 is a circular recess.

The first mounting portion 240 and the second mounting portion 260 are substantially symmetric. In this manner, a user can stably grip the information processing device 1 in which the left controller 300 and the right controller 400 are mounted to the terminal case 20.

The terminal 250 is provided to the left side surface of the terminal case 20. In other words, the terminal 250 is provided to the left side surface of the first mounting portion 240. The terminal 250 is connected to a terminal 340 of the left controller 300 illustrated in FIG. 6. Thus, the shape of the terminal 250 corresponds to the shape of the terminal 340. When the terminal 250 is connected to the terminal 340 of the left controller 300, the terminal case 20 transmits and receives signals to and from the left controller 300.

The terminal 270 is provided to the right side surface of the terminal case 20. In other words, the terminal 270 is provided to the right side surface of the second mounting portion 260. The terminal 270 is connected to a terminal 440 of the right controller 400 illustrated in FIG. 7. Thus, the shape of the terminal 270 corresponds to the shape of the terminal 440. When the terminal 270 is connected to the terminal 440 of the right controller 400, the terminal case 20 transmits and receives signals to and from the right controller 400.

The terminal 280 is provided to the right side surface of the terminal case 20. In other words, the terminal 280 is provided to the right side surface of the second mounting portion 260. In FIG. 5, the terminal 280 is provided at a lower part (Y-axis negative direction side) of the right side surface of the second mounting portion 260. The terminal 280 is connected to a terminal 450 of the right controller 400 illustrated in FIG. 7. Thus, the shape of the terminal 280 corresponds to the shape of the terminal 450. When the terminal 280 is connected to the terminal 450 of the right controller 400, the terminal case 20 transmits and receives signals to and from the right controller 400.

The terminal 250, the terminal 270, and the terminal 280 have shapes that do not protrude from the terminal case 20. For example, a protruding contact terminal is used for the terminal 340, the terminal 440, or the terminal 450, and recess terminals corresponding to the above-mentioned terminals are used for the terminal 250, the terminal 270, and the terminal 280. For example, when the terminal 340, the terminal 440, or the terminal 450 is a terminal formed by using a plurality of movable contact probes whose distal ends elongate and contract by springs called "pogo pins", pad-shaped electrodes to be brought into contact with the distal ends of the pogo pins corresponding to the number of pogo pins are used for the terminal 250, the terminal 270, and the terminal 280. The terminal 250, the terminal 270, and the terminal 280 have shapes that do not protrude from the terminal case 20, and hence the terminal case 20 can have a shape with good design.

The coupling portion 290 is provided so as to protrude from the inner surface of the second mounting portion 260 to the housing space 211. The coupling portion 290 is inserted to a terminal included in the terminal 10 to couple the terminal case 20 and the terminal 10 together. The coupling portion 290 is disposed at a position corresponding to the position of the terminal in the terminal 10. For example, the coupling portion 290 is a universal serial bus (USB) plug, and a coupling hole in the terminal 10 may be a USB jack. In this case, the controller 30 and the terminal 10 communicate through the coupling portion 290.

For example, by using USB power delivery (USB PD) for the coupling portion 290, power can be supplied to the terminal 10.

<1.3. Appearance Configuration Example of Controller 30>

Next, the structure of the controller 30 is described in detail with reference to FIG. 6 and FIG. 7. The controller 30 includes the left controller 300 and the right controller 400. As described above, the controller 30 has a structure in which the left controller 300 and the right controller 400 are separated from each other. The left controller 300 and the right controller 400 are described in detail below.

<1.3.1. Appearance Configuration Example of Left Controller 300>

First, the left controller 300 is described. The left controller 300 has a part extended downward on the left side, and the part has a shape curved in a back surface direction. The left controller 300 has an operation portion 310 on the front surface and the top surface, a button 320 on the back surface, and a mounted portion 330 for mounting the terminal case 20 thereon in a right region of the left controller 300. Note that the mounted portion 330 is an example of a first mounted portion according to the present disclosure.

As illustrated in the front view in FIG. 6, the operation portion 310 has a button 311, a button 312, a button 313, a button 314, a button 315, a button 316, and a stick 317.

The button 311, the button 312, the button 313, and the button 314 are used for a user to make instructions corresponding to various kinds of computer programs executed by the terminal 10. For example, the button 311, the button 312, the button 313, and the button 314 are used to input directions, but may be used for other purposes than the input of directions. Note that the button 311, the button 312, the button 313, and the button 314 may be integrated as a single button.

The button 315 is provided in an upper right region of the front surface of the left controller 300. The button 315 is used to transmit an image displayed on the screen of the terminal 10 to another terminal. For example, when a user presses the button 315, for example, an image or a moving image displayed on the terminal 10 is transmitted to another terminal used by another user.

The button 316 is provided in a center region of the front surface of the left controller 300. The button 316 is a button for controlling the terminal 10, and when a user presses the button 316, the switching of on and off of power of the terminal 10, the switching of an application running on the terminal 10, and the displaying of items that can be operated, on the screen of the terminal 10, depending on situations are performed.

The stick 317 is provided in a lower region of the front surface of the left controller 300. For example, the stick 317 can input a direction, and can be tilted in all directions of planes perpendicular to the front-back direction. By tilting the stick 317, the user can input a direction corresponding to the tilting direction and the degree of the tilting.

As illustrated in the plan view in FIG. 6, the operation portion 310 has a button 318 and a button 319 on its top surface. The button 318 is provided on the top surface of the left controller 300 on the front side of the button 319.

The button 318 and the button 319 are used for a user to make instructions corresponding to various kinds of computer programs executed by the terminal 10.

As illustrated in the back view in FIG. 6, the button 320 is disposed on the back surface of the left controller 300. When the button 320 is pressed by the user, the movable claw portion 333 illustrated in the right side view moves. In this manner, the movable claw portion 333 locked to the locking reception portion 241 in the terminal case 20 is detached from the locking reception portion 241, and the left controller 300 and the terminal case 20 are separated from each other. The button 320 is an example of an operation button according to the present disclosure.

The mounted portion 330 has the first extending portion 331 extending in the right direction on the front surface of the mounted portion 330 and a second extending portion 332 extending in the right direction on the back surface of the mounted portion 330. The left controller 300 has, on a surface coupling the first extending portion 331 and the second extending portion 332 together, the movable claw portion 333, the claw portion 334, the positioning portion 335, and the terminal 340. The movable claw portion 333 and the claw portion 334 are an example of a locking piece according to the present disclosure.

As described above, the length d3 of the first extending portion 331 in the left-right direction is equal to or smaller than the length d1 of the first mounting portion 240 in the terminal case 20 in the left-right direction. The length d5 of the second extending portion 332 in the left-right direction is larger than the length d3 of the first extending portion 331 in the left-right direction.

A space between the first extending portion 331 and the second extending portion 332 is opened in the right direction and the up-down direction. The space is opened in the up-down direction, and hence even when the length of the terminal case 20 in the up-down direction is larger than the length of the mounted portion 330 in the up-down direction, the left controller 300 can be connected to the terminal case 20.

The movable claw portion 333 has a shape that can be locked to the locking reception portion 241 in the first mounting portion 240, and is provided at a position corresponding to the locking reception portion 241.

The claw portion 334 has a shape that can be locked to the locking reception portion 242 in the first mounting portion 240, and is provided at a position corresponding to the locking reception portion 242.

The positioning portion 335 has a shape that can be fitted to the positioning portion 243 in the first mounting portion 240, and is provided at a position corresponding to the positioning portion 243. The shape of the positioning portion 335 corresponds to the shape of the positioning portion 243 such that the positioning portion 335 and the positioning portion 243 are fitted together. For example, in the right side view in FIG. 6, the positioning portion 335 is a circular protrusion.

The terminal 340 is provided on the surface coupling the first extending portion 331 and the second extending portion 332 and at a position corresponding to the terminal 250 of the terminal case 20, and the shape of the terminal 340 corresponds to the shape of the terminal 250. For example, the terminal 340 is a terminal formed by using a plurality of pogo pins. The number of pogo pins is changed as appropriate depending on the number of input devices.

Note that the left controller 300 may include a vibration device, a voice output device, or an illumination device.

<1.3.2. Appearance Configuration Example of Right Controller 400>

Next, the right controller 400 is described. The right controller 400 has a part extended downward on the right side, and the part has a shape curved in the back surface direction. The right controller 400 has an operation portion 410 on the front surface and the top surface, a button 420 on the back surface, and the mounted portion 430 for mounting the terminal case 20 thereon in a right region of the right controller 400. The right controller 400 has a voice output portion 460 and a power supply portion 470 on the bottom surface thereof. Note that the mounted portion 430 is an example of a second mounted portion in the present disclosure.

As illustrated in the front view in FIG. 7, the operation portion 410 has a button 411, a button 412, a button 413, a button 414, a button 415, and a stick 416.

The button 411, the button 412, the button 413, and the button 414 are used for a user to make instructions corresponding to various kinds of computer programs executed by the terminal 10. For example, the user inputs instructions such as selection, determination, and canceling through the button 411, the button 412, the button 413, or the button 414. Note that the button 411, the button 412, the button 413, and the button 414 may be integrated as a single button.

The button 415 is provided in an upper right region of the front surface of the right controller 400. For example, the button 415 is used to display a screen for changing the settings of the terminal 10. For example, when a user presses the button 415, for example, the terminal 10 displays a setting screen.

The stick 416 is provided in a lower region of the front surface of the right controller 400. Similarly to the stick 317, for example, the stick 416 can input a direction, and can be tilted in all directions of planes perpendicular to the front-back direction. By tilting the stick 416, the user can input a direction corresponding to the tilting direction and the degree of the tilting.

As illustrated in the plan view in FIG. 7, the operation portion 410 has a button 417 and a button 418 on the top surface of the right controller 400. The button 417 is provided on the top surface of the right controller 400 and on the front side of the button 418.

The button 417 and the button 418 are used for a user to make instructions corresponding to various kinds of computer programs executed by the terminal 10.

As illustrated in the back view in FIG. 7, the button 420 is disposed on the back surface of the right controller 400. When the button 420 is pressed by the user, the movable claw portion 433 described later moves forward. In this manner, the movable claw portion 433 locked to the locking reception portion 261 in the second mounting portion 260 of the terminal case 20 is detached from the locking reception portion 261, and the right controller 400 and the terminal case 20 are separated from each other. The button 420 is an example of an operation button according to the present disclosure.

As illustrated in the plan view or the bottom view in FIG. 7, the mounted portion 430 has the third extending portion 431 extending in the left direction on the front surface of the mounted portion 430 and a fourth extending portion 432 extending in the left direction on the back surface of the mounted portion 430. As illustrated in the left side view in FIG. 7, the right controller 400 has, on a surface coupling the third extending portion 431 and the fourth extending portion 432 together, the movable claw portion 433, the claw portion 434, the positioning portion 435, the terminal 440, and the terminal 450. The movable claw portion 433 and the claw portion 434 are an example of a locking piece according to the present disclosure.

As described above, the length d4 of the third extending portion 431 in the left-right direction is equal to or smaller than the length d2 of the second mounting portion 260 of the terminal case 20 in the left-right direction. A length d6 of the fourth extending portion 432 in the left-right direction is larger than the length d4 of the third extending portion 431 in the left-right direction.

A space between the third extending portion 431 and the fourth extending portion 432 is opened in the left direction and the up-down direction. The space is opened in the up-down direction, and hence even when the length of the terminal case 20 in the up-down direction is larger than the length of the mounted portion 430 in the up-down direction, the right controller 400 can be connected to the terminal case 20.

The movable claw portion 433 has a shape that can be locked to the locking reception portion 261 in the second mounting portion 260, and is provided at a position corresponding to the locking reception portion 261.

The claw portion 434 has a shape that can be locked to the locking reception portion 262 in the second mounting portion 260, and is provided at a position corresponding to the locking reception portion 262.

The positioning portion 435 has a shape that can be fitted to the positioning portion 263 in the second mounting portion 260, and is provided at a position corresponding to the positioning portion 263. The shape of the positioning portion 435 corresponds to the shape of the positioning portion 263 such that the positioning portion 435 and the positioning portion 263 are fitted together.

For example, in the left side view in FIG. 7, the positioning portion 435 is a circular protrusion.

The terminal 440 is provided on the surface coupling the third extending portion 431 and the fourth extending portion 432 and at a position corresponding to the terminal 270 of the terminal case 20, and the shape of the terminal 440 corresponds to the shape of the terminal 270. For example, the terminal 440 is a terminal formed by using a plurality of pogo pins. The number of pogo pins is changed as appropriate depending on the number of input devices.

The terminal 450 is provided on the surface coupling the third extending portion 431 and the fourth extending portion 432 and at a position corresponding to the terminal 280 of the terminal case 20, and the shape of the terminal 450 corresponds to the shape of the terminal 280. For example, the terminal 450 is a terminal formed by using a plurality of pogo pins. The number of pogo pins is changed as appropriate depending on the number of input devices.

Note that the right controller 400 may include a vibration device or an illumination device.

As illustrated in the bottom view in FIG. 7, the voice output portion 460 is provided at a lower part of the right controller 400. For example, the voice output portion 460 is an audio jack, and a plug of a voice output device such as earphones or headphones is inserted into the voice output portion 460. For example, in the case where wired earphones are connected to the voice output portion 460 and the user wears the earphones for use, the voice output portion 460 is provided at the lower part of the right controller 400, and hence a cable for the earphones is prevented from being located on the visual line of the user viewing the display of the terminal 10. In addition, the voice output portion 460 is provided at the lower part of the right controller 400, and hence the cable for the earphones is prevented from being located near various kinds of buttons provided to the controller 30. As a result, the user can operate the controller 30 more comfortably.

As illustrated in the bottom view in FIG. 7, the power supply portion 470 is provided at a lower part of the power supply portion 713 and on the back side of the voice output portion 460. The power supply portion 470 is connected to an external power source. When the power supply portion 470 is connected to the external power source in a wired manner, similarly to the above, the operation by the user can be prevented from being hindered by a cable that connects the power supply portion 470 and the external power source.

2. Mounting Example of Information Processing Device 1

Next, a mounting example of the information processing device 1 is described with reference to FIG. 3 to FIG. 7. First, connection between the terminal 10 and the terminal case 20 is described. The terminal 10 is housed in the housing space 211 in the terminal case 20 illustrated in FIG. 3. As illustrated in FIG. 4, the terminal 10 is inserted to the housing space 211 from a direction in which the cutouts 212 are disposed in a state in which the lid member 220 of the terminal case 20 is detached from the housing member 210. The coupling portion 290 is inserted to the terminal of the inserted terminal 10. After that, the locking portions 221 included in the lid member 220 are locked to the locking reception portions 213 of the housing member 210, and hence the lid member 220 is fixed to the housing member 210. The terminal 10 housed in the housing space is detachably fixed to the terminal case 20 by the housing member 210, the lid member 220, and the coupling portion 290. The area of the opening 230 is smaller than the area of the terminal 10, and hence the terminal 10 is prevented from falling off the terminal case 20 through the opening 230. When the locking by the locking portions 221 and the locking reception portions 213 is released, the lid member 220 can be detached from the housing member 210. In this manner, the terminal 10 can be taken out of the terminal case 20.

Next, connection between the terminal case 20 and the controller 30 is described. The terminal case 20 is mounted so as to be sandwiched by the left controller 300 and the right controller 400.

First, connection between the terminal case 20 and the left controller 300 is described with reference to FIG. 3 and FIG. 6. The left controller 300 is mounted to the terminal case 20 when the mounted portion 330 thereof is mounted to the first mounting portion 240 of the terminal case 20. Specifically, the first mounting portion 240 is inserted between the first extending portion 331 and the second extending portion 332 such that the positioning portion 243 and the positioning portion 335 are fitted together. In this case, the movable claw portion 333 and the claw portion 334 are locked to the locking reception portion 241 and the locking reception portion 242, respectively. The terminal 250 contacts with the terminal 340. The length d3 of the first extending portion 331 in the left-right direction is smaller than the length d1 of the first mounting portion 240 in the left-right direction, and hence the left controller 300 is fixed to the terminal case 20 while a part of the display of the terminal 10 is not covered with the first extending portion 331. The positioning portion 243 and the positioning portion 335 are fitted together, and hence a user can easily mount the left controller 300 to the terminal case 20. The length d5 of the second extending portion 332 in the left-right direction is larger than the length d3 of the first extending portion 331 in the left-right direction, and hence the terminal case 20 and the left controller 300 can be prevented from being separated from each other when force of twisting the terminal case 20 and the left controller 300 is applied during the operation by the user.

In the case of separating the terminal case 20 and the left controller 300 from each other, by pressing the button 320, the movable claw portion 333 moves to release the locking by the movable claw portion 333 and the locking reception portion 241. After the locking by the movable claw portion 333 and the locking reception portion 241 is released, the locking by the claw portion 334 and the locking reception portion 242 is released to separate the terminal case 20 and the left controller 300 from each other.

Next, connection between the terminal case 20 and the right controller 400 is described with reference to FIG. 5 and FIG. 7. The right controller 400 is mounted to the terminal case 20 when the mounted portion 430 thereof is mounted to the second mounting portion 260 of the terminal case 20. Specifically, the second mounting portion 260 is inserted between the third extending portion 431 and the fourth extending portion 432 such that the positioning portion 263 and the positioning portion 435 are fitted together. In this case, the movable claw portion 433 and the claw portion 434 are locked to the locking reception portion 261 and the locking reception portion 262, respectively. The terminal 270 and the terminal 280 contact with the terminal 440 and the terminal 450, respectively. The length d4 of the third extending portion 431 in the left-right direction is shorter than the length d2 of the second mounting portion 260 in the left-right direction, and hence the right controller 400 is fixed to the terminal case 20 while a part of the display of the terminal 10 is not covered with the third extending portion 431. The positioning portion 263 and the positioning portion 435 are fitted together, and hence a user can easily mount the right controller 400 to the terminal case 20. The length d6 of the fourth extending portion 432 in the left-right direction is larger than the length d4 of the third extending portion 431 in the left-right direction, and hence the terminal case 20 and the right controller 400 can be prevented from being separated from each other when force of twisting the terminal case 20 and the right controller 400 is applied during the operation by the user.

In the case of separating the terminal case 20 and the right controller 400 from each other, by pressing the button 420, the movable claw portion 433 moves to release the locking by the movable claw portion 433 and the locking reception portion 261. After the locking by the movable claw portion 433 and the locking reception portion 261 is released, the locking by the claw portion 434 and the locking reception portion 262 is released to separate the terminal case 20 and the right controller 400 from each other.

When the controller 30 is mounted to the terminal case 20, the user can more stably grip the information processing device having the terminal 10 mounted thereon.

The connection examples of the terminal case 20 and the controller 30 have been described above. Note that the controller 30 may have a structure in which the left controller 300 and the right controller 400 are integrated. Specifically, the controller 30 may have a structure in which the second extending portion 332 of the left controller 300 and the fourth extending portion 432 of the right controller 400 are integrated.

3. Functional Configuration Example of Information Processing Device 1

Figure 8:
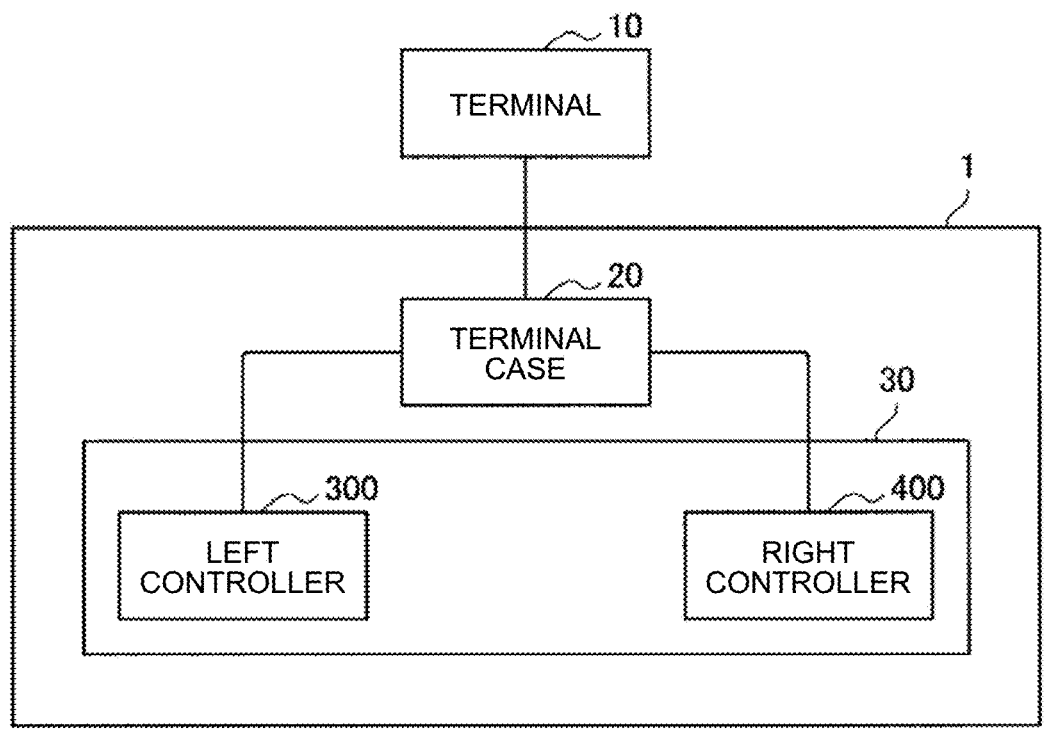
FIG. 8 is a block diagram of an information processing system to which the information processing device according to one embodiment of the present disclosure is applied.
Figure 9:
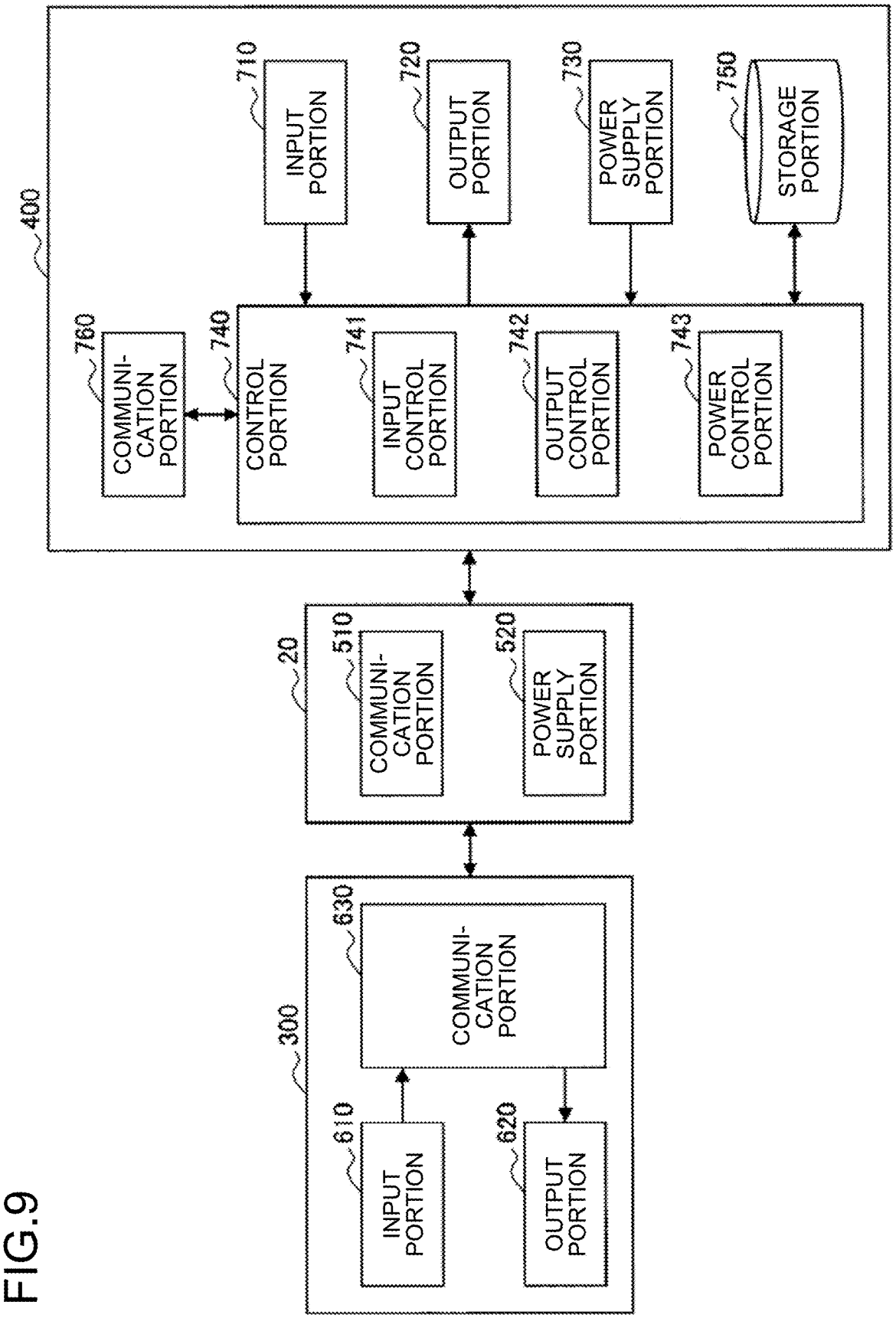
FIG. 9 is a block diagram of the information processing device according to the embodiment.

Next, an example of a functional configuration of the information processing device 1 according to the present embodiment is described with reference to FIG. 8 and FIG. 9. FIG. 8 is a block diagram of an information processing system to which the information processing device according to one embodiment of the present disclosure is applied. FIG. 9 is a block diagram of the information processing device according to the embodiment. As illustrated in FIG. 8, the information processing device 1 communicates with the terminal 10.

As illustrated in FIG. 9, the terminal case 20 includes a communication portion 510 and a power supply portion 520.

The communication portion 510 transmits and receives various kinds of signals to and from the terminal 10 and the controller 30. The terminal 250, the terminal 270, the terminal 280, the coupling portion 290, and wiring (not shown) disposed inside the back surface of the terminal case 20 correspond to the communication portion 510. The communication portion 510 is an example of a communication portion according to the present disclosure.

The power supply portion 520 supplies the terminal 10 with power supplied from the controller 30. The power supply portion 520 is mounted to the coupling portion 290.

The left controller 300 includes an input portion 610, an output portion 620, and a communication portion 630.

The input portion 610 inputs instructions corresponding to various kinds of computer programs executed by the terminal 10. The button 311, the button 312, the button 313, the button 314, the button 315, the button 316, the stick 317, the button 318, and the button 319 correspond to the input portion 610.

The output portion 620 converts and outputs a signal output from the terminal 10. The output portion 620 is, for example, a vibration device, a voice output device, or an illumination device, and vibrates or illuminates in accordance with a signal output from the terminal 10.

The communication portion 630 transmits and receives various kinds of signals to and from the terminal case 20. The terminal 340 corresponds to the communication portion 630.

The right controller 400 includes an input portion 710, an output portion 720, a power supply portion 730, a control portion 740, a storage portion 750, and a communication portion 760.

The input portion 710 inputs instructions corresponding to various kinds of computer programs executed by the terminal 10. The button 411, the button 412, the button 413, the button 414, the button 415, the stick 416, the button 417, and the button 418 correspond to the input portion 710.

The output portion 720 converts and outputs a signal output from the terminal 10. The output portion 720 is, for example, a vibration device, a voice output device, or an illumination device, and vibrates or illuminates in accordance with a signal output from the terminal 10. The voice output portion 460 corresponds to the output portion 720.

The power supply portion 730 supplies the terminal case 20 with power input from an external power source. The terminal 450 and the power supply portion 470 correspond to the power supply portion 730.

The control portion 740 controls signals to be transmitted and received, and controls power supplied from an external power source. The control portion 740 includes an input control portion 741, an output control portion 742, and a power control portion 743.

The input control portion 741 controls a signal input by the input portion 610 or the input portion 710.

The output control portion 742 controls the output portion 620 or the output portion 720 in accordance with a signal transmitted from the terminal 10.

The power control portion 743 controls power supplied from the power supply portion 730. The power control portion 743 is, for example, a USB PD controller.

The storage portion 750 appropriately records therein various kinds of computer programs and databases used for the controller 30 to execute various kinds of processing. In the storage portion 750, various parameters and processes of the processing that need to be saved when the controller 30 performs various kinds of processing may be recorded as appropriate.

The communication portion 760 transmits and receives various kinds of information to and from the terminal case 20. The terminal 440 and the terminal 450 correspond to the communication portion 760.

The functional configuration of the information processing device 1 has been described above in detail.

4. Operation Example of Information Processing Device 1

Next, operation of the information processing device 1 is described. Various kinds of buttons or the stick 317 in the left controller 300 or various kinds of buttons or the stick 416 in the right controller 400 is operated by a user, and a signal is input to the left controller 300 or the right controller 400.

A signal input from the left controller 300 is transmitted to the right controller 400 through the terminal 340, the terminal 250, the wiring, and the terminal 270 provided to the terminal case 20, and the terminal 440 in the right controller 400. The signal received by the right controller 400 is transmitted to the terminal 10 through the terminal 450 and the terminal 280 and the coupling portion 290 in the terminal case 20. The terminal 10 performs output to an output portion such as a display in accordance with the received signal.

A signal input from the right controller 400 is transmitted to the terminal 10 through the terminal 450 and the terminal 280 and the coupling portion 290 in the terminal case 20. The terminal 10 performs output to the output portion such as a display in accordance with the received signal.

The information processing device 1 receives a signal from the terminal 10, and the controller 30 performs output based on the signal.

The terminal 10 transmits a signal to the right controller 400 through the coupling portion 290 and the terminal 280 provided to the terminal case 20 and the terminal 450 provided to the right controller 400. For example, the right controller 400 causes a voice output device connected to the voice output portion 460 to output voice based on the received signal. When the right controller 400 includes a vibration device or an illumination device, the right controller 400 may cause these devices to perform output based on the received signal.

The right controller 400 transmits the received signal to the left controller 300 through the terminal 440, the terminal 270, the wiring, and the terminal 250 provided to the terminal case 20, and the terminal 340 provided to the left controller 300. When the left controller 300 includes a vibration device or an illumination device, the left controller 300 causes these devices to perform output based on the received signal.

Note that, in the present embodiment, the communication between the terminal 10 and the terminal case 20 is performed in a wired manner through the coupling portion 290, but the communication is not limited to wired communication. The communication may be performed in a wireless manner.

5. Hardware Configuration Example

The embodiments according to the present disclosure have been described above. The above-mentioned information processing is implemented by cooperation of software and hardware of an information processing system or an information processing device described below.

Figure 10:
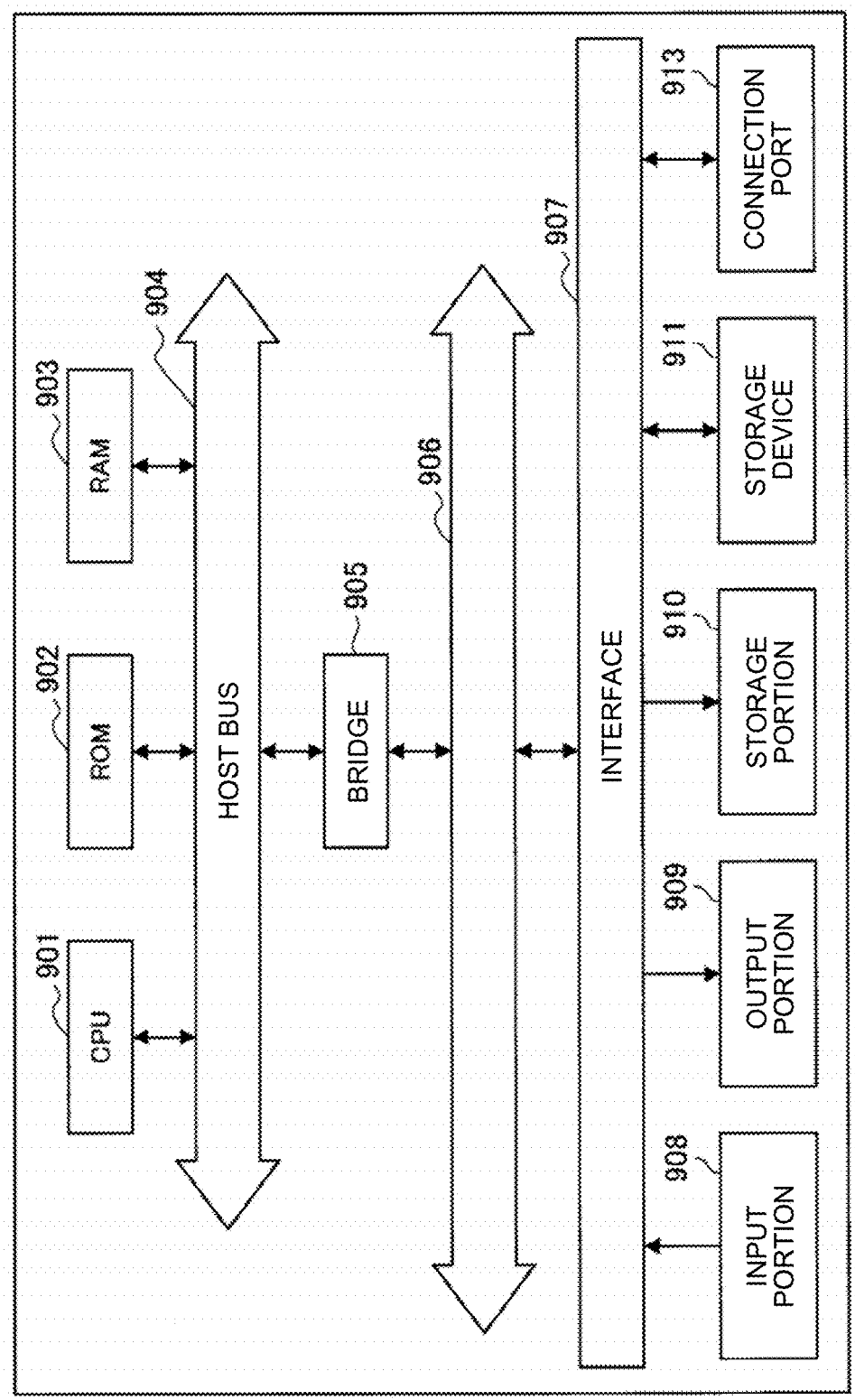
FIG. 10 is a diagram illustrating an example of a hardware configuration of the information processing device according to the embodiment.

FIG. 10 is a block diagram illustrating a hardware configuration example of the information processing device according to one embodiment of the present disclosure. Referring to FIG. 10, the information processing device according to the present embodiment includes, for example, a CPU 901, a ROM 902, a RAM 903, a host bus 904, a bridge 905, an external bus 906, an interface 907, an input portion 908, an output portion 909, a storage portion 910, and a connection port 911. Note that the hardware configuration described here is an example, and a part of the components may be omitted. The hardware configuration may further include components other than the components described here.

The CPU 901 functions as, for example, an arithmetic processing device or a control device, and controls the entire or part of operation of the components based on various kinds of computer programs recorded in the ROM 902, the RAM 903, and the storage portion 910. The CPU 901 may form the control portion 740.

The ROM 902 is a unit for storing therein computer programs read onto the CPU 901 and data used for arithmetic operation. In the RAM 903, for example, computer programs read onto the CPU 901 and various kinds of parameters that change as appropriate when the computer programs are executed are temporarily or permanently stored.

The CPU 901, the ROM 902, and the RAM 903 are mutually connected, for example, through the host bus 904 capable of high-speed data transmission. On the other hand, for example, the host bus 904 is connected to the external bus 906 whose data transmission speed is relatively low through the bridge 905. The external bus 906 is connected to various kinds of components through the interface 907.

As the input portion 908, various kinds of buttons or the stick 317 provided to the left controller 300 or various kinds of buttons or the stick 416 provided to the right controller 400 is applied. As the input portion 908, a voice input device may be applied.

The output portion 909 is a device capable of outputting visual or auditory information to a user. The output portion 909 corresponds to the voice output portion 460. The output portion 909 may be a vibration device, a voice output device, or an illumination device, and may be, for example, an audio jack.

The storage portion 910 is a device for storing various kinds of data therein. As the storage portion 910, for example, a magnetic storage device, a semiconductor storage device, an optical storage device, or a magnetooptical storage device is used. The storage portion 910 corresponds to the storage portion 750.

The connection port 911 is a port used to connect an external connection device, and is, for example, a universal serial bus (USB) port or an audio terminal. The connection port 911 may be an IEEE 1394 port, a small computer system interface (SCSI), or an RS-232C port.

6. Conclusion

As described above, the present disclosure can provide a terminal case capable of mounting an external device thereon without detaching a case.

While the preferred embodiments of the present disclosure have been described in detail above with reference to the accompanying drawings, the technical scope of the present disclosure is not limited to the examples. It is obvious that a person having ordinary skill in the technical field of the present disclosure could conceive of various variations and modifications within the range of the technical concept recited in the claims, and it should be understood that these variations and modifications naturally belong to the technical scope of the present disclosure.

The effects described herein are merely illustrative and exemplary, and are not limited. In other words, the technique according to the present disclosure can exert other effects obvious to the person skilled in the art from the description herein together with the above-mentioned effects or in place of the above-mentioned effects.

Note that the following configurations also belong to the technical scope of the present disclosure.

(1)

A terminal case, comprising:

a housing portion having an opening in at least one surface of the housing portion, for housing a terminal;

a mounting portion to which a gripping device including a gripping portion to be gripped by a user is mounted; and a communication portion for communicating between the terminal and the gripping device.

(2)

The terminal case according to (1), wherein a plurality of the mounting portions are provided on one side of the terminal case and another side opposite to the one side of the terminal case, respectively, and two gripping portions included in the gripping device are mounted to at least one of the mounting portion on the one side and the mounting portion on the other side, respectively.

(3)

The terminal case according to (2), wherein, in a direction from the one side toward the other side, a length of a surface of each of the mounting portions on a side of the surface having the opening is equal to or larger than a length of a surface of a mounted portion on the side of the surface having the opening, the mounted portion included in the gripping device and to which the mounting portion is mounted.

(4)

The terminal case according to any one of (1) to (3), wherein the mounting portion includes a plurality of locking reception portions to which a plurality of locking pieces included in the gripping device are locked.

(5)

The terminal case according to any one of (1) to (4), wherein the mounting portion includes a coupling portion for coupling the terminal.

(6)

The terminal case according to (5), wherein the coupling portion transmits and receives a signal between the terminal and the gripping device.

(7)

The terminal case according to (5) or (6), wherein the coupling portion supplies power to the terminal.

(8)

A gripping device, comprising:
a first gripping portion to be gripped by a user; and
a second gripping portion to be gripped by the user, the second gripping portion being different from the first gripping portion, wherein
the first gripping portion and the second gripping portion each include a mounted portion to which a terminal case for housing a terminal is mounted, and a communication portion for communicating with the terminal through the terminal case.

(9)

The gripping device according to (8), wherein
a first mounted portion included in the first gripping portion mounts thereon a first mounting portion provided on one side of the terminal case, and
a second mounted portion included in the second gripping portion mounts thereon a second mounting portion provided on another side opposite to the one side of the terminal case.

(10)

The gripping device according to (9), wherein
the terminal case includes a surface having an opening, and
when the first mounted portion mounts the first mounting portion thereon and the second mounted portion mounts the second mounting portion thereon,
the first mounted portion includes a first extending portion located on a side of the surface of the terminal case having the opening and a second extending portion located on a side of a surface opposite to the surface having the opening, and
the second mounted portion includes a third extending portion located on a side of the surface of the terminal case having the opening and a fourth extending portion located on the side of the surface opposite to the surface having the opening.

(11)

The gripping device according to (10), wherein the first extending portion extends in a direction in which the third extending portion is located along the surface of the terminal case having the opening,
the second extending portion extends in a direction in which the fourth extending portion is located along the surface opposite to the surface of the terminal case having the opening,
the third extending portion extends in a direction in which the first extending portion is located along the surface of the terminal case having the opening, and
the fourth extending portion extends in a direction in which the second extending portion is located along the surface opposite to the surface of the terminal case having the opening.

(12)

The gripping device according to (11), wherein
a length of the first extending portion in an extending direction of the first extending portion is equal to or smaller than a length of the first mounting portion in the extending direction, and
a length of the third extending portion in an extending direction of the third extending portion is equal to or smaller than a length of the second mounting portion in the extending direction.

(13)

The gripping device according to (11) or (12), wherein
the surface of the terminal case having the opening is parallel to the surface opposite to the surface of the terminal case having the opening, and
a length of the second extending portion in an extending direction of the second extending portion is equal to or larger than a length of the first extending portion in an extending direction of the first extending portion.

(14)

The gripping device according to any one of (8) to (13), wherein the mounted portion includes a plurality of locking pieces to be locked to locking reception portions included in the terminal case.

(15)

The gripping device according to (14), further comprising an operation button for operating the locking pieces, wherein
a first locking piece among the locking pieces is movable by the operation button.

(16)

The gripping device according to any one of (8) to (15), further comprising an operation portion used by the user to operate the terminal.

(17)

The gripping device according to any one of (8) to (16), further comprising a power supply portion for supplying power to the terminal through the terminal case.

(18)

An information processing device, comprising:
a terminal case for housing a terminal; and
a gripping device to be gripped by a user, wherein
the terminal case includes
a housing portion having an opening in at least one surface of the housing portion, for housing the terminal,
a mounting portion to which a gripping device including a gripping portion to be gripped by the user is mounted, and a communication portion for communicating between the terminal and the gripping device, the gripping device includes a first gripping portion to be gripped by the user, and a second gripping portion to be gripped by the user, the second gripping portion being different from the first gripping portion, and the first gripping portion and the second gripping portion each include a mounted portion to which the terminal case housing the terminal is mounted, and a communication portion for communicating with the terminal through the terminal case.

While the preferred embodiments of the present disclosure have been described in detail above with reference to the accompanying drawings, the technical scope of the present disclosure is not limited to the examples. It is obvious that a person having ordinary skill in the technical field of the present disclosure could conceive of various variations and modifications within the range of the technical concept recited in the claims, and it should be understood that these variations and modifications naturally belong to the technical scope of the present disclosure.

For example, the control portion is provided to the right controller in the above-mentioned embodiments, but the present technique is not limited to the example. For example, the control portion may be provided to the left controller, and the control portion may be provided to the terminal case.

In the above-mentioned embodiments, the case where the housing member and the lid member are mounted by being locked together has been described, but the present technique is not limited to the example. The housing member and the lid member only need to be detachably mounted.

In the above-mentioned embodiments, the case where the terminal case and the controller are mounted by being locked together has been described, but the present technique is not limited to the example. The terminal case and the controller only need to be detachably mounted while having stable mountability when the present technique is used.

REFERENCE SIGNS LIST

1 INFORMATION PROCESSING DEVICE
10 TERMINAL
20 TERMINAL CASE
30 CONTROLLER
210 HOUSING MEMBER
211 HOUSING SPACE
212 CUTOUT
213 LOCKING RECEPTION PORTION
214 LENS HOLE
215 ILLUMINATION HOLE
220 LID MEMBER
221 LOCKING PORTION
230 OPENING
240 FIRST MOUNTING PORTION
241, 242, 261, 262 LOCKING RECEPTION PORTION
243, 263, 335, 435 POSITIONING PORTION
250, 270, 280, 340, 440, 450 TERMINAL
260 SECOND MOUNTING PORTION
290 COUPLING PORTION
300 LEFT CONTROLLER
320, 420 BUTTON
330, 430 MOUNTED PORTION
331 FIRST EXTENDING PORTION
332 SECOND EXTENDING PORTION
333, 433 MOVABLE CLAW PORTION
334, 434 CLAW PORTION
400 RIGHT CONTROLLER
431 THIRD EXTENDING PORTION
432 FOURTH EXTENDING PORTION
460 VOICE OUTPUT PORTION
470 POWER SUPPLY PORTION

The invention claimed is:

1. A terminal case, comprising:

a housing portion having an opening in at least one surface of the housing portion, for housing a terminal;

a mounting portion to which a gripping device including a gripping portion to be gripped by a user is to be mounted, the mounting portion including a plurality of locking reception portions to which a plurality of locking pieces included in the gripping device are to be locked; and a communication portion for communicating between the terminal and the gripping device, wherein the terminal case includes a surface having an opening, and when the first mounted portion mounts the first mounting portion thereon and the second mounted portion mounts the second mounting portion thereon, the first mounted portion includes a first extending portion located on a side of the surface of the terminal case having the opening and a second extending portion located on a side of a surface opposite to the surface having the opening, and the second mounted portion includes a third extending portion located on a side of the surface of the terminal case having the opening and a fourth extending portion located on the side of the surface opposite to the surface having the opening.

2. The terminal case according to claim 1, wherein a plurality of the mounting portions are provided on one side of the terminal case and another side opposite to the one side of the terminal case, respectively, and two gripping portions included in the gripping device are mounted to at least one of the mounting portion on the one side and the mounting portion on the other side, respectively.

3. The terminal case according to claim 2, wherein, in a direction from the one side toward the other side, a length of a surface of each of the mounting portions on a side of the surface having the opening is equal to or larger than a length of a surface of a mounted portion on the side of the surface having the opening, the mounted portion included in the gripping device and to which the mounting portion is mounted.

4. The terminal case according to claim 1, wherein the mounting portion includes a coupling portion for coupling the terminal.

5. The terminal case according to claim 4, wherein the coupling portion transmits and receives a signal between the terminal and the gripping device.

6. The terminal case according to claim 4, wherein the coupling portion supplies power to the terminal.

7. A gripping device, comprising:

a first gripping portion to be gripped by a user; and a second gripping portion to be gripped by the user, the second gripping portion being different from the first gripping portion, wherein the first gripping portion and the second gripping portion each include a mounted portion to which a terminal case for housing a terminal is mounted, the mounted portion including a plurality of locking pieces to be locked to locking reception portions in the terminal case, and a communication portion for communicating with the terminal through the terminal case, wherein a first mounted portion included in the first gripping portion mounts thereon a first mounting portion provided on one side of the terminal case, and a second mounted portion included in the second gripping portion mounts thereon a second mounting portion provided on another side opposite to the one side of the terminal case, wherein the terminal case includes a surface having an opening, and when the first mounted portion mounts the first mounting portion thereon and the second mounted portion mounts the second mounting portion thereon, the first mounted portion includes a first extending portion located on a side of the surface of the terminal case having the opening and a second extending portion located on a side of a surface opposite to the surface having the opening, and the second mounted portion includes a third extending portion located on a side of the surface of the terminal case having the opening and a fourth extending portion located on the side of the surface opposite to the surface having the opening.

8. The gripping device according to claim 7, wherein
the first extending portion extends in a direction in which the third extending portion is located along the surface of the terminal case having the opening,
the second extending portion extends in a direction in which the fourth extending portion is located along the surface opposite to the surface of the terminal case having the opening,
the third extending portion extends in a direction in which the first extending portion is located along the surface of the terminal case having the opening, and
the fourth extending portion extends in a direction in which the second extending portion is located along the surface opposite to the surface of the terminal case having the opening.

9. The gripping device according to claim 8, wherein
a length of the first extending portion in an extending direction of the first extending portion is equal to or smaller than a length of the first mounting portion in the extending direction, and
a length of the third extending portion in an extending direction of the third extending portion is equal to or smaller than a length of the second mounting portion in the extending direction.

10. The gripping device according to claim 8, wherein
the surface of the terminal case having the opening is parallel to the surface opposite to the surface of the terminal case having the opening, and
a length of the second extending portion in an extending direction of the second extending portion is equal to or larger than a length of the first extending portion in an extending direction of the first extending portion.

11. The gripping device according to claim 7, further comprising an operation button for operating the locking pieces, wherein
a first locking piece among the locking pieces is movable by the operation button.

12. The gripping device according to claim 7, further comprising an operation portion used by the user to operate the terminal.

13. The gripping device according to claim 7, further comprising a power supply portion for supplying power to the terminal through the terminal case.

14. An information processing device, comprising:
a terminal case for housing a terminal, and
a gripping device to be gripped by a user, wherein the terminal case includes
a housing portion having an opening in at least one surface of the housing portion, for housing the terminal,
a mounting portion to which the gripping device including a gripping portion to be gripped by the user is mounted, the mounting portion including a plurality of locking reception portions, and
a communication portion for communicating between the terminal and the gripping device,
the gripping device includes
a first gripping portion to be gripped by the user, and
a second gripping portion to be gripped by the user, the second gripping portion being different from the first gripping portion, and
the first gripping portion and the second gripping portion each include a mounted portion to which the terminal case housing the terminal is mounted, the mounted portion including a plurality of locking pieces to be locked to the locking reception portions in the terminal case, and a communication portion for communicating with the terminal through the terminal case,
wherein the terminal case includes a surface having an opening, and
when the first mounted portion mounts the first mounting portion thereon and the second mounted portion mounts the second mounting portion thereon,
the first mounted portion includes a first extending portion located on a side of the surface of the terminal case having the opening and a second extending portion located on a side of a surface opposite to the surface having the opening, and
the second mounted portion includes a third extending portion located on a side of the surface of the terminal case having the opening and a fourth extending portion located on the side of the surface opposite to the surface having the opening.

15. The information processing device according to claim 14, wherein the plurality of locking pieces have a different locking shape from each other and the locking reception portions have a corresponding different reception shape.

16. The terminal case according to claim 1, wherein the plurality of locking reception portions have a different reception shape and the locking pieces have a corresponding different locking shape.

17. The gripping device according to claim 7, wherein the plurality of locking pieces have a different locking shape from each other and the locking reception portions have a corresponding different reception shape.

* * * * *